United States Patent [19]

Pickrell et al.

[11] Patent Number: 5,404,901
[45] Date of Patent: Apr. 11, 1995

[54] APPARATUS FOR FLUID TRANSFER

[75] Inventors: John W. Pickrell, Scottsdale; Gregory E. Hogue, Buckeye; William M. Finch, Paradise Valley, all of Ariz.

[73] Assignee: Wilbur-Ellis Company, Buckeye, Ariz.

[21] Appl. No.: 158,720

[22] Filed: Nov. 28, 1993

Related U.S. Application Data

[63] Continuation of Ser. No. 900,599, Jun. 18, 1992, abandoned, which is a continuation-in-part of Ser. No. 563,292, Aug. 16, 1990, Pat. No. 5,123,441.

[51] Int. Cl.⁶ .............................. F16K 27/08
[52] U.S. Cl. .................... 137/381; 137/322; 137/614.03; 222/400.7
[58] Field of Search ............... 137/614.03, 382, 322, 137/381, 565; 141/384; 222/400.7, 400.8

[56] References Cited

U.S. PATENT DOCUMENTS

| 3,205,923 | 9/1965 | Wilson | 141/291 |
|---|---|---|---|
| 3,228,413 | 1/1966 | Stevens, Jr. | 137/322 |
| 3,261,382 | 7/1966 | Ensign | 141/207 |
| 3,294,291 | 12/1966 | Sichler | 222/400.7 |
| 3,637,117 | 1/1972 | Johnston | 222/400.7 |
| 3,645,286 | 2/1972 | Follett | 137/614.2 |
| 3,648,893 | 3/1972 | Whiting | 137/614.2 |
| 4,095,713 | 6/1978 | Norton | 137/382 |
| 4,844,123 | 7/1989 | Wick | 137/322 |
| 4,844,123 | 7/1989 | Wick | 137/614.2 |

FOREIGN PATENT DOCUMENTS 103116  5/1899  Germany .......................... 137/322

Primary Examiner—A. Michael Chambers
Attorney, Agent, or Firm—Robert A. Parsons; Don J. Flickinger; Albert W. Davis, Jr.

[57] ABSTRACT

An apparatus for fluid transfer including a valve assembly, receivable by a container, having a check valve for unidirectional flow of material, and a release valve having a closed position, and an open position, a coupler, receivable by the valve assembly to move the release valve to an open position, having a sliding valve.

23 Claims, 9 Drawing Sheets

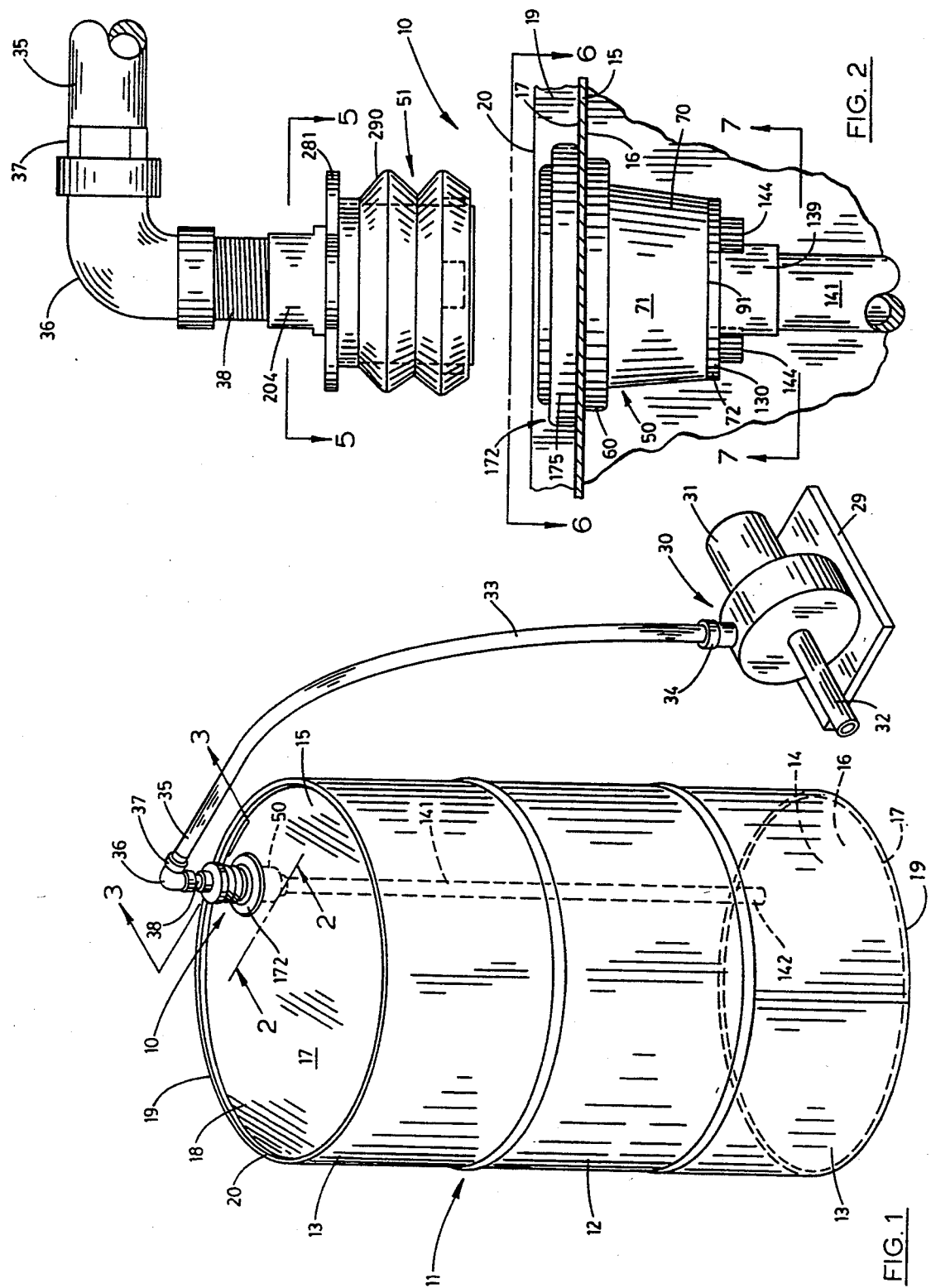

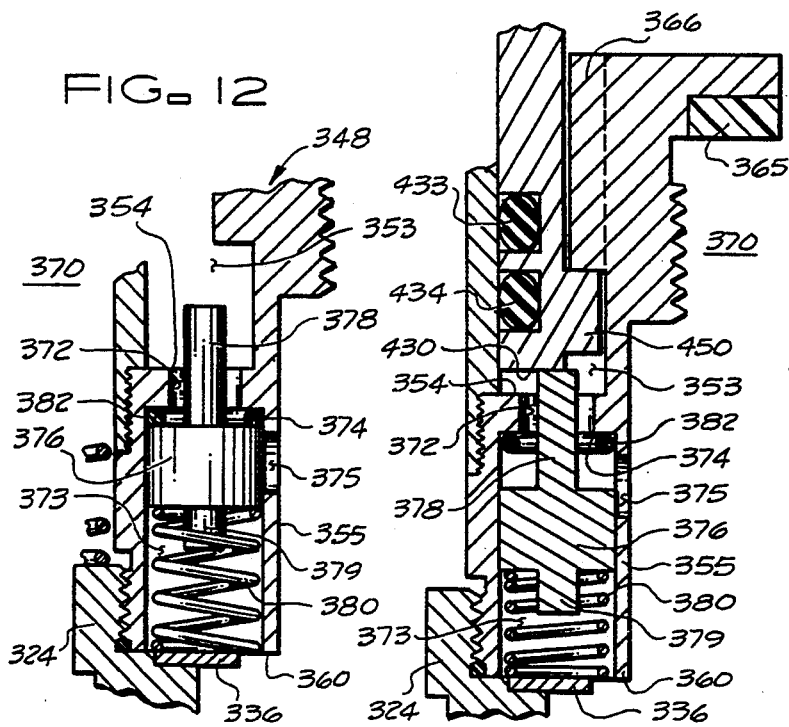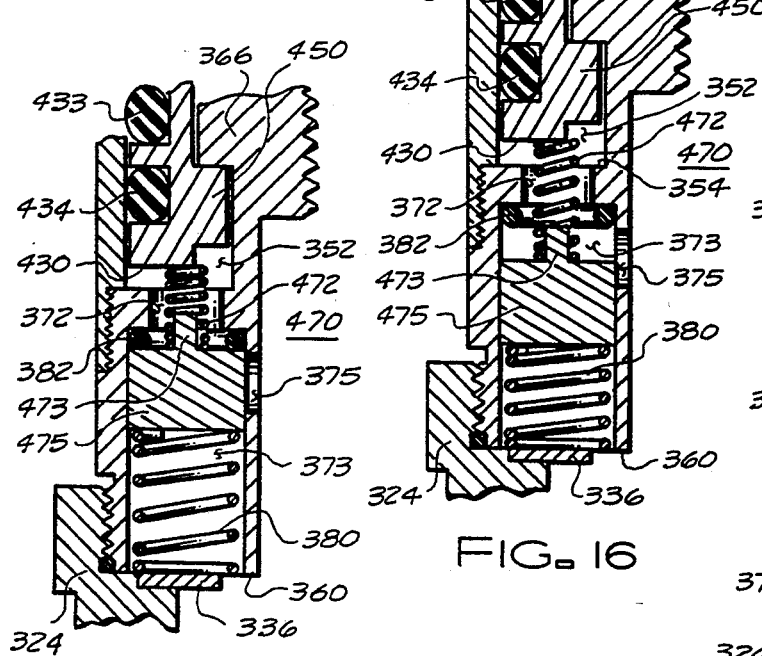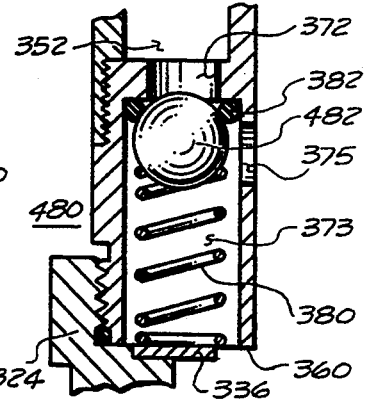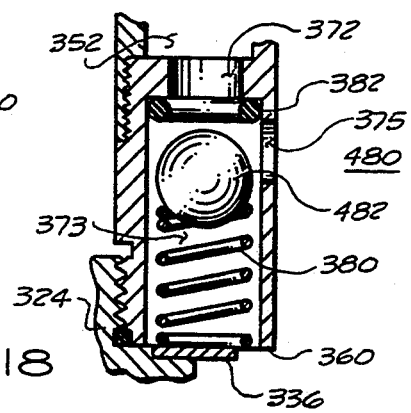

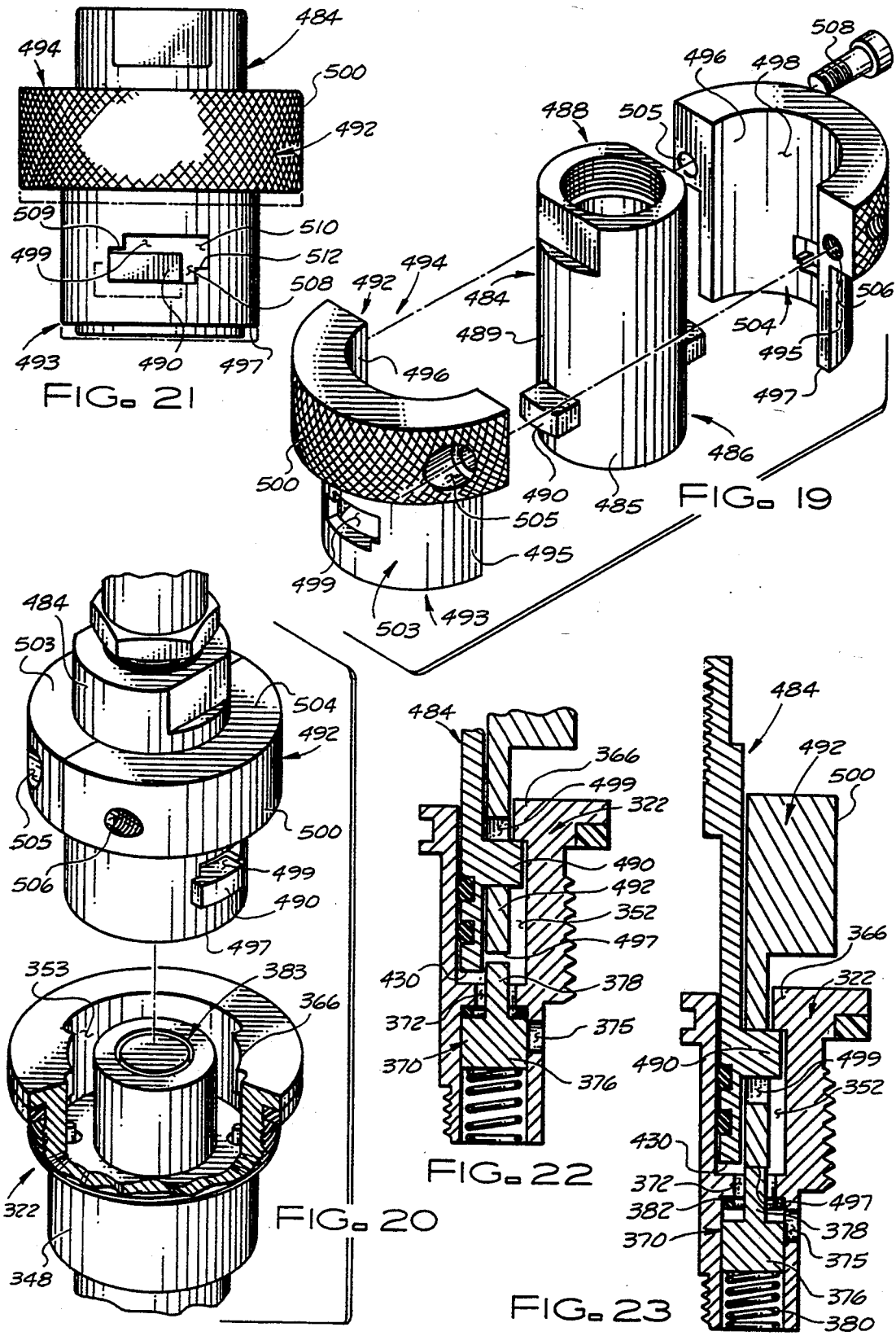

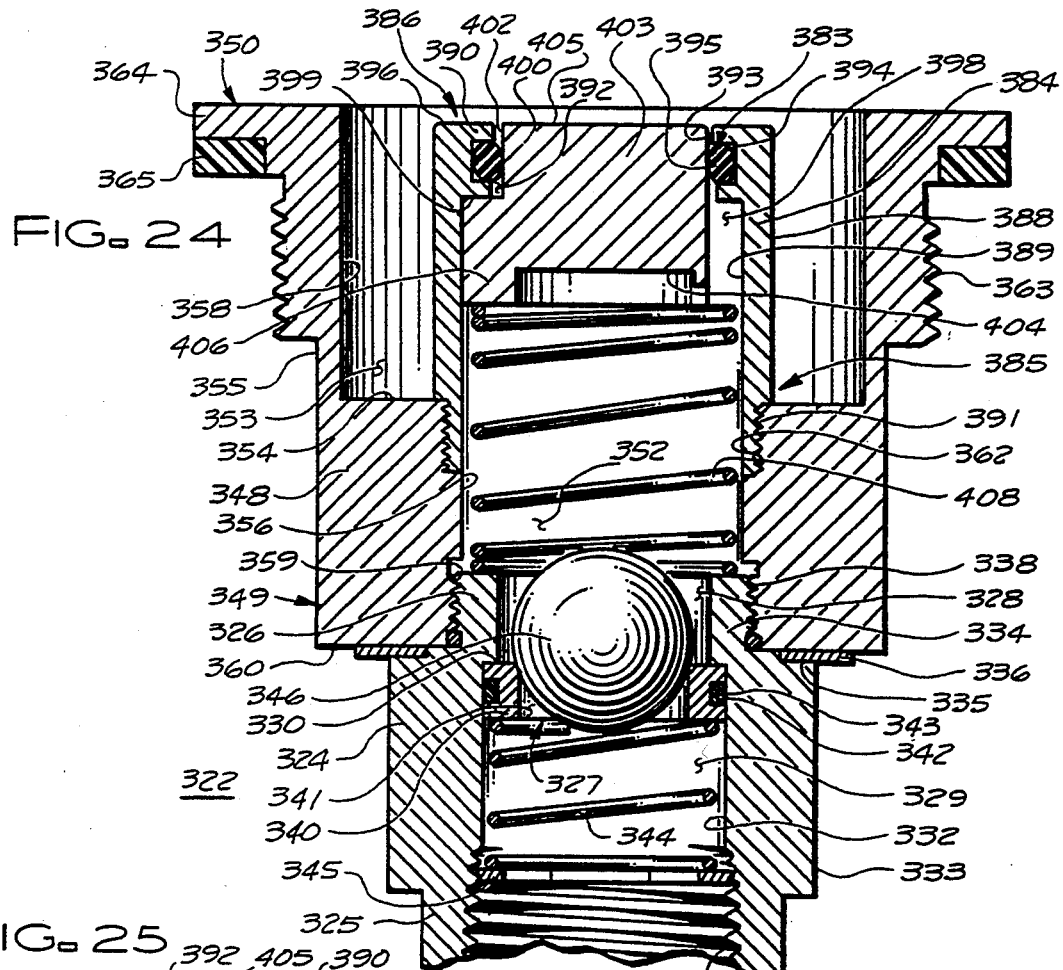
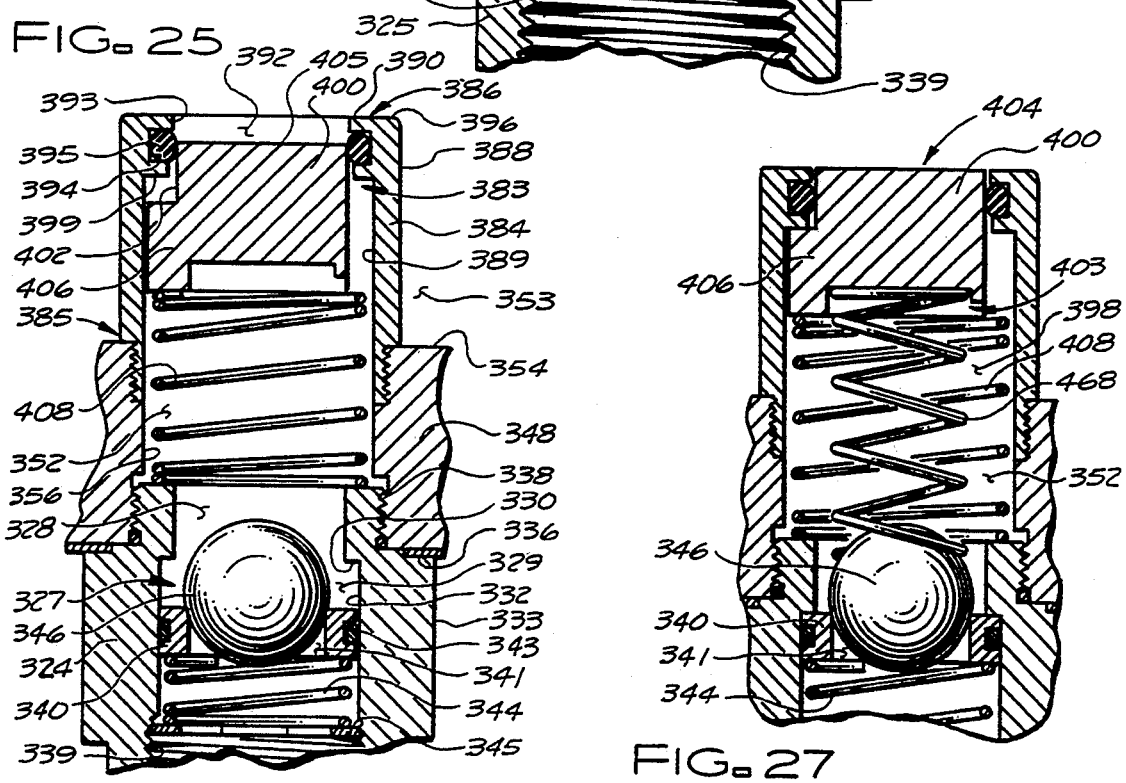

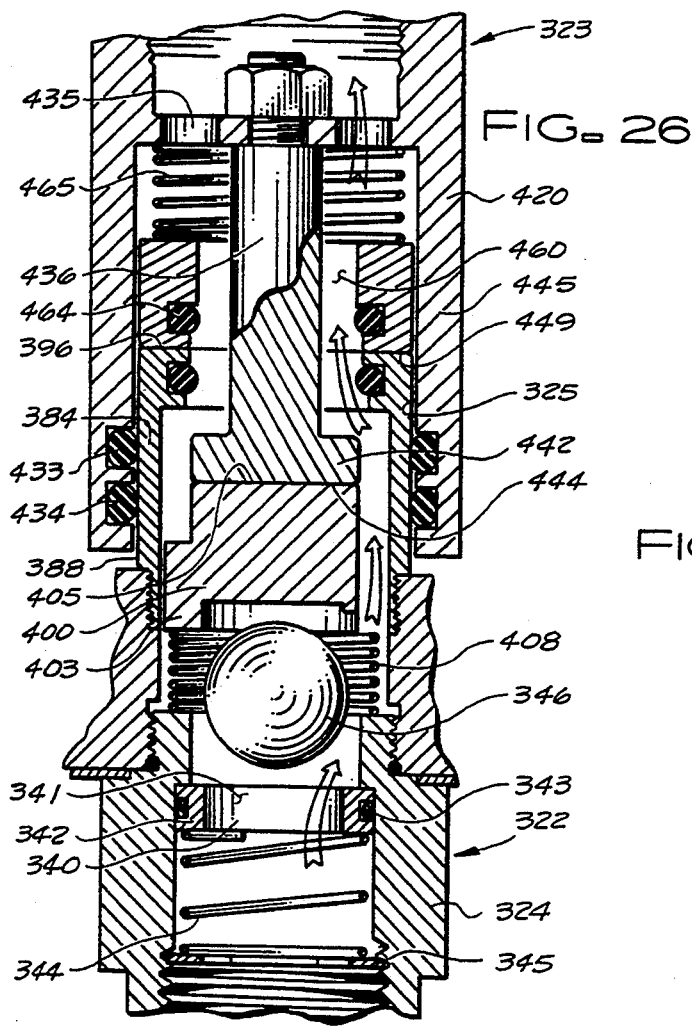
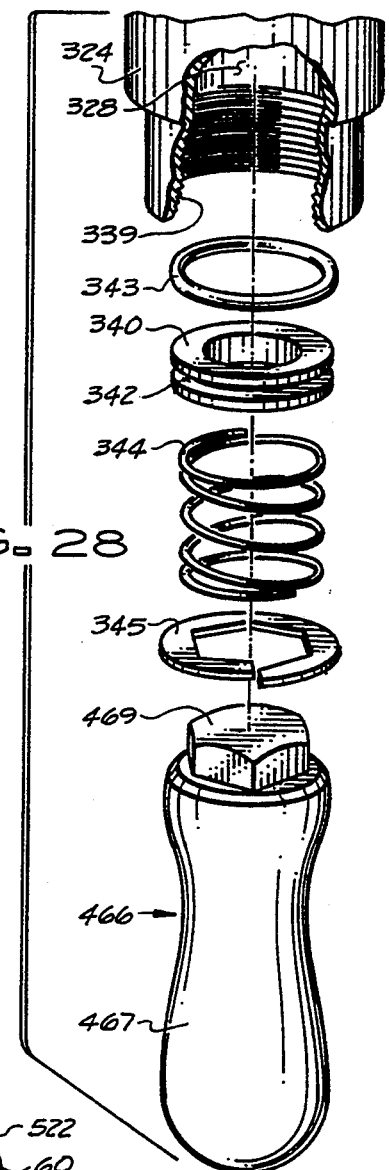
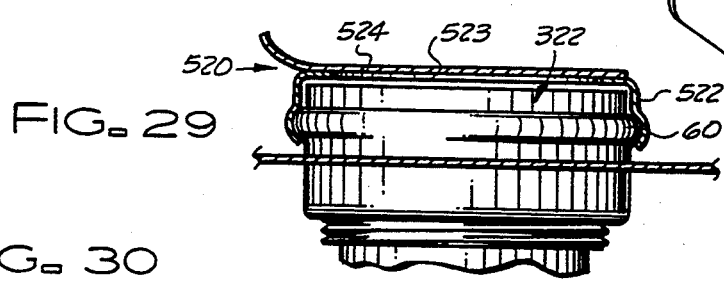
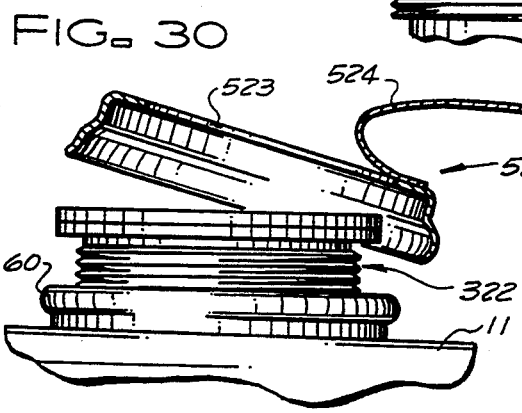
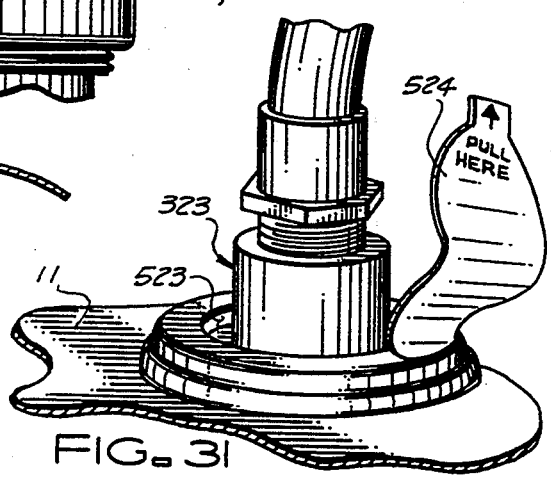

APPARATUS FOR FLUID TRANSFER

CROSS-REFERENCE TO RELATED APPLICATION

This application is a continuation of application Ser. No. 07/900,599, filed 18 Jun., 1992, abandoned, which is a Continuation-In-Part of application Ser. No. 07/563,292, filed 6 Aug. 1990, now U.S. Pat. No. 5,123,441.

BACKGROUND OF THE INVENTION

1. Field of the Invention

This invention relates to an apparatus for the transferal of fluids from a container.

More particularly, the present invention relates to a valve with an associated coupling having a dry break feature particularly well suited for use in transferring hazardous materials from a container.

In a further and more specific aspect, the instant invention relates to dry break valves incorporating features which prevent contamination of the container to which it is affixed, and which contribute to the safe transport and transferal of hazardous material, virtually eliminating the risk of contamination of the environment and exposure to the hazardous materials by person employing them.

2. Prior Art.

The identification of certain substances as hazardous and, more specifically, the recognition by manufacturers, scientific and governmental authorities in the public at large of the multiplicity of risks, both short term and long term, associated with the use of such substances has caused considerable effort to be devoted to the development of devices for handling such materials. In this regard, the hazards associated with containerizing, storing, transporting and using toxic substances and the like has caused considerable developmental work to be devoted to the strengthening of containers, valves and transferring equipment and the isolation of the substances during the transfer to and from the containers. However, many of these problems persist, particularly with fluid transfer devices, many of which do not insure adequate safety to the environment and persons during transfer. Still further, a chronic problem resides in the safe disposable of such containers once used.

Today, local, state and federal regulatory bodies are concern with the problems associated with the disposal of containers that were used to contain hazardous materials. The definition of hazardous material extends over many products in several industries, and it has been estimated that more than fifty million containers exist. These containers can range in capacity from one gallon to more than a hundred gallons. Do to the large number of containers which have been used to contain and transport hazardous materials, new regulations, particularly in the area of pesticides, are being drafted to allow for reusable containers which will be dedicated to a single product. This will greatly reduce the number of containers that would have to be disposed of. However, reusing a container may also impose significant problems. When returned, the reusable container would have to be rinsed to remove any contaminants which might affect the material to be inserted. The rinse material itself poses a significant environmental threat, since it would contain residues of the toxic material. This problem could be eliminated by refilling the containers with no rinse. However, this could lead to the contamination of the material by foreign substances that were introduced into the container. The prior art does not sufficiently prevent the injection of foreign material into the containers, nor does it indicate that contamination by injection of a foreign substance has occurred. Therefore, in order to insure an uncontaminated product, the containers must be rinsed, producing further hazardous material which must be disposed of.

Conventional containers for containing hazardous materials have been characterized by elaborate valve systems designed to extract the substances from the containers in such a fashion as to be sealed from the environment. Substantially all such valves extend well beyond the end of the container and therefore are exposed to impact during handling. This is a risk, for example, were the containers are inadvertently dropped, or fall from the vehicle during transport along roadways, or where the transporting vehicle is involved in an accident. The exposure of such prior art valves to impact creates a substantial risk that during such inadvertent contact, the valve will be damaged in such a fashion as to leak the substance from the container or may actually be broken off so as to cause a substantial spill of the hazardous material into the environment.

Even in devices where the valve is relatively safe, shielded from impact, there is a substantial danger of spillage present when the coupler is attached to the valve for extraction of the hazardous material. This is a critical point, when there is a lot of activity near the container, and the container with valve and coupler are the most vulnerable. If the container is dropped or tipped over, the coupler, extending well past any protective shield, could strike the ground, causing a break and subsequent spillage. Other spills could result from pressure being applied to a hose extending from the coupler. The coupler, extending from the valve, would act as a lever, damaging or removing the valve from the container when pressure is applied. The prior art does not address this problem, which could result in substantial spillage of hazardous material.

The hazards occasioned by unattended discharges are well recognized and constitute a considerable hazard to health and the environment. This has resulted in immense monitory judgments against manufacturer, common carriers and others. Insurance rates have escalated in direct portion to such judgments.

There are many other problems associated with storing and transferring hazardous materials. One such, is properly venting the container. Valves must contain some venting device which allows air to enter the container as the hazardous material is extracted. This prevents a vacuum from building, which potentially could collapse the container. However, these vents could pose a potential safety hazard. Pressure occasionally builds up inside the containers, especially if stored in a warm environment, or left in the sun. In these situations, the pressure build up could force hazardous material outward through the vents contaminating the environment and posing a significant health hazard. This is most likely to occur when the coupler is attached and extraction of material is just beginning.

While safety is a major concern for dry break valves, the proper operation of the valve is also a necessary consideration. If a valve cannot be opened the material in the container cannot be removed and is therefore, rendered useless. Disfunction of a valve can occur through faulty construction, or more commonly through a fluid or hydraulic lock. During certain circumstances, liquid may enter the valve assembly preventing movement of the valve member, in effect, blocking the valve and preventing it from being opened. The entrance of liquid into the valve assembly can occur in different ways. The hydraulic lock can occur when extracting the liquid. When the transfer of material is stopped, liquid passing through the valve into the coupler may flow back into the valve assembly when suction is removed. As the coupling is removed, liquid is trapped in the valve assembly locking it into a close position. Any subsequent attempt to attach the coupler to initiate further transfer of material would be futile. The hydraulic lock can also occur if a container is tipped onto its side allowing fluid to flow into the valve assembly. Once a fluid block occurs, the coupler cannot be attached and fluid cannot be extracted. The valve assembly must be removed and cleared before further transfer can be initiated. This somewhat defeats the purpose of the dry break valve system since removing the valve increases the potential for spills and poses a significant health hazard.

Therefore, it has long been known that it would be desirable to have an apparatus for fluid transfer which is particularly well suited to the containerizing, storing, transporting, transferring and using of virtually any fluid substance, but particularly toxic substances so as virtually to insure that such substances are not inadvertently exposed to the environment or to those persons handling the substances and which obviate the difficulty of disposing of such containers once emptied of their contents.

It would be highly advantageous, therefore, to remedy the foregoing and other deficiencies inherent in the prior art.

Accordingly, it is an object of the present invention to provide an improved apparatus for fluid transfer.

Another object of the present invention is to provide an apparatus for fluid transfer which can be employed on virtually any type of container and in combination with virtually any type of handling facilities and equipment and, similarly, can be employed in the transfer of virtually any fluid substance.

And another object of the invention is to provide an apparatus which can be manufactured as an integral part of newly manufactured containers as well as being retrofitted on existing containers.

Still another object of the present invention is to provide an apparatus which will meet the strictest safety standards for the most toxic of materials.

Yet another object of the invention is to provide an apparatus which is so constructed as to be protected from damage by impact as a result, for example, of being dropped, thereby substantially avoiding the risk of leakage or spilling as a consequence.

Yet still another object of the invention is to provide a break away feature associated with the valve and coupler connection, to prevent spillage resulting from a force being applied to the coupler.

A further object of the present invention is to provide an apparatus which permits containers for substances, and particularly toxic substances, to be reused virtually in definitely so as to avoid the proliferation of toxic containers for which no safe and effective method of disposal exist, and to provide a means by which they may be reused without the need for rinsing the containers.

And a further object of the present invention is to provide an apparatus having a check valve allowing only one way flow of fluid, to prevent contamination of the container from outside materials, thereby allowing re-use of the containers without the need for rinsing and the problems associated therewith.

Yet a further object of the present invention is to provide an apparatus employing a tamper evident seal to insure knowledge of possible contamination.

Yet a further object of the present invention is to provide an apparatus which would allow for reuse of containers, without costly cleaning and associated problems.

And yet a further object of the present invention is to provide an apparatus which has an anti-hydraulic lock feature to insure the smooth functioning of the valve.

And yet still another object of the present invention is to provide an apparatus which has a safety venting feature to prevent escape of material from vents.

SUMMARY OF THE INVENTION

Briefly, to achieve the desired objects of the instant invention in accordance with a preferred embodiment thereof, provided is a valve assembly for engagement with a container, and a coupler receivable by the valve assembly. The valve assembly includes a release valve for allowing outflow of material from a container, and a check valve for preventing inflow of material into the container. A break away coupling is also provided for receiving the coupler. The coupler includes a slide valve for allowing movement of outflowing material from the valve assembly to flow therethrough.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective view showing the apparatus for fluid transfer of the present invention in a typical operative environment adapted for the transfer of fluid from a drum through the medium of a fluid pump;

FIG. 2 is a somewhat enlarged, fragmentary, transverse vertical section taken along line 2—2 of FIG. 1;

FIG. 4 is a somewhat enlarged, fragmentary, vertical section taken from the same position as FIG. 3, but showing the coupling of the present invention disconnected from the valve assembly thereof;

FIG. 8 is a somewhat enlarged, horizontal section taken from a position indicated by line 8—8 in FIG. 4;

FIG. 9 is a somewhat enlarged, fragmentary, horizontal section taken from a position indicated by line 9—9 in FIG. 4;

FIG. 12 is an enlarged, fragmentary, vertical section of a venting valve in the closed position;

FIG. 13 is the venting valve illustrated in FIG. 12 in an open position;

FIG. 14 is an enlarged, fragmentary, vertical section of an alternate venting valve in a closed position;

FIG. 15 is an enlarged, fragmentary, vertical section of an alternate embodiment of a venting valve in a closed position;

FIG. 16 is a view similar to FIG. 15 with the venting valve in an open position;

FIG. 17 is an enlarged, fragmentary, vertical section of an alternate venting valve in a closed position;

FIG. 18 is a view similar to FIG. 17 with the venting valve in an open position;

FIG. 19 is an exploded perspective view illustrating the coupler with selective venting feature;

FIG. 20 is a perspective view illustrating the coupler with the selective venting collar receivable by the valve assembly;

FIG. 21 is a side view of the coupler with associated selective venting collar illustrated in the open and closed position;

FIG. 22 is an enlarged, fragmentary, vertical section of a closed vent valve with the selective venting collar in a closed position;

FIG. 23 is a view similar to FIG. 22, with a selective venting feature in a open position, opening the venting valve;

FIG. 24 is an enlarged, vertical section of the valve assembly of the present invention, having a sliding check valve in the closed position;

FIG. 25 is an enlarged, fragmentary, vertical section of the release valve being depressed, against a fluid block resulting in the movement of the check valve;

FIG. 26 is an enlarged, fragmentary, vertical section of the coupler attached to the valve assembly and illustrating the flow of material therethrough;

FIG. 27 is an enlarged, fragmentary, vertical section of the differential spring check valve of the valve assembly;

FIG. 28 is an exploded, partial perspective view of a tool receiving a sliding check valve seat for installation in the valve assembly;

FIG. 29 is a sectional side view illustrating a tamper proof seal installed on the valve assembly coupled to a container;

FIG. 30 is a sectional side view illustrating the removal of the tamper evidence seal indicating tampering; and FIG. 31 is a perspective view illustrating the coupler attached to the valve assembly with the proper use of the tamper evidence seal, showing no indication of tampering.

DETAILED DESCRIPTION OF THE PREFERRED EMBODIMENT

Figure 3:
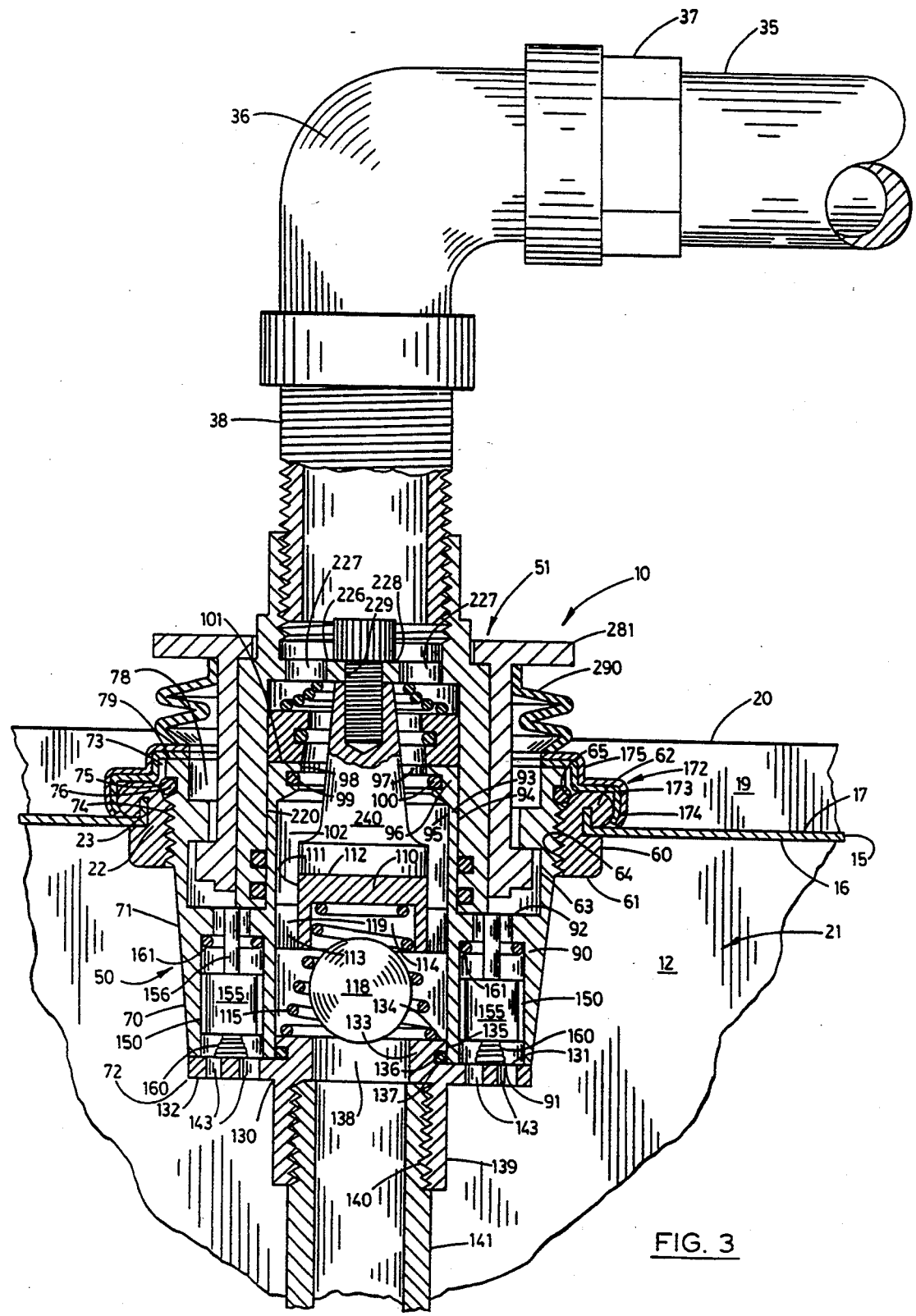
FIG. 3 is a somewhat further enlarged, fragmentary, vertical section taken along line 3—3 of FIG. 1.

Referring more particularly to the drawings, the apparatus for fluid transfer of the present invention is generally indicated by the numeral 10 in FIG. 1. The apparatus can be employed in significantly varied environments and in a host of different embodiments. The environment shown in the drawings and described herein is employed for illustrative convenience and represents only one such typical operative environment.

A housing, container, vessel or drum 11 has a substantially cylindrical side wall 12 having opposite end portions 13. The drum has a bottom wall 14 and an opposite top wall 15 individually mounted on the opposite end portions of the side wall. The bottom and top walls have interior surfaces 16 and opposite exterior surfaces 17. The bottom and top walls have peripheral edge portions 18 which are individually welded on the opposite end portions of the side wall forming a circular ridge or chime 19. Each chime has an upper edge 20 extending endwardly of its respective bottom or top wall. The drum is thus so constructed as to have a fluid tight internal chamber 21. A bung hole or opening 22 is formed in and extends through the top wall 15 adjacent to the chime and is bounded by a peripheral edge 23.

As shown in FIG. 1, a mounting plate 29 mounts a conventional fluid pump 30. The fluid pump has a drive motor 31 and a discharge conduit 32. The discharge conduit is connected by any suitable means, not shown, to any desired fluid receiving system, not shown. An intake conduit 33 is mounted on the fluid pump 30 by a coupling 34. The intake conduit has a distal end portion 35 mounting an elbow 36 by means of a union 37. The elbow has an externally screw threaded end portion 38.

The apparatus for fluid transfer 10 has three main components. The first is a female or valve assembly 50 shown best in FIGS. 3 and 4. The second is a male assembly or coupling 51, also shown best in FIGS. 3 and 4. The third is a housing removing tool 52 shown in FIG. 10.

The female or valve assembly 50 is coupled to a mounting assembly or collar 60 consisting of an interior ring 61 which is received within the opening 22 of the drum 11 and a crimped portion 62 extending outwardly through the opening and mounted on the peripheral edge 23 bounding the opening in fluid tight relation. The mounting collar has an internally screw threaded bore 63 having internal screw threads 64. Bounding the internally screw threaded bore 63 is a shoulder surface 65.

The valve assembly 50 has a housing 70 having a frustoconical external surface 71 and a substantially flat lower end portion 72. The housing has an upper end portion 73 having external screw threads 74 formed thereabout and a ring groove 75 housing an O-ring 76 inscribed about the upper end portion above the external screw threads. The housing 70 is screw-threadably mounted in the mounting collar 60 by screw threaded engagement of the external screw threads 74 with the internal screw threads 64 of the mounting collar. The housing is thus mounted in fluid tight relation with the mounting collar with the O-ring 76 engaging the shoulder surface 65 in fluid tight engagement.

The housing 70 has an internal upper chamber 77 communicating externally of the upper end portion 73 through a mouth 78 bounded by an annular end surface 79 extending about the mouth. As can best be seen upon reference to FIGS. 3 and 4, the annular end surface which constitutes the upper most portion of the housing is recessed from the upper edge 20 of the chime 19 of the drum 11.

The housing 70 has a lower body portion 90 extending from the upper chamber 77 to the lower end portion 72. The lower body portion has a lower surface 91. The lower body portion has an upper surface or floor surface 92 constituting the floor surface of the upper chamber 77.

Figures 4, 8, 9:
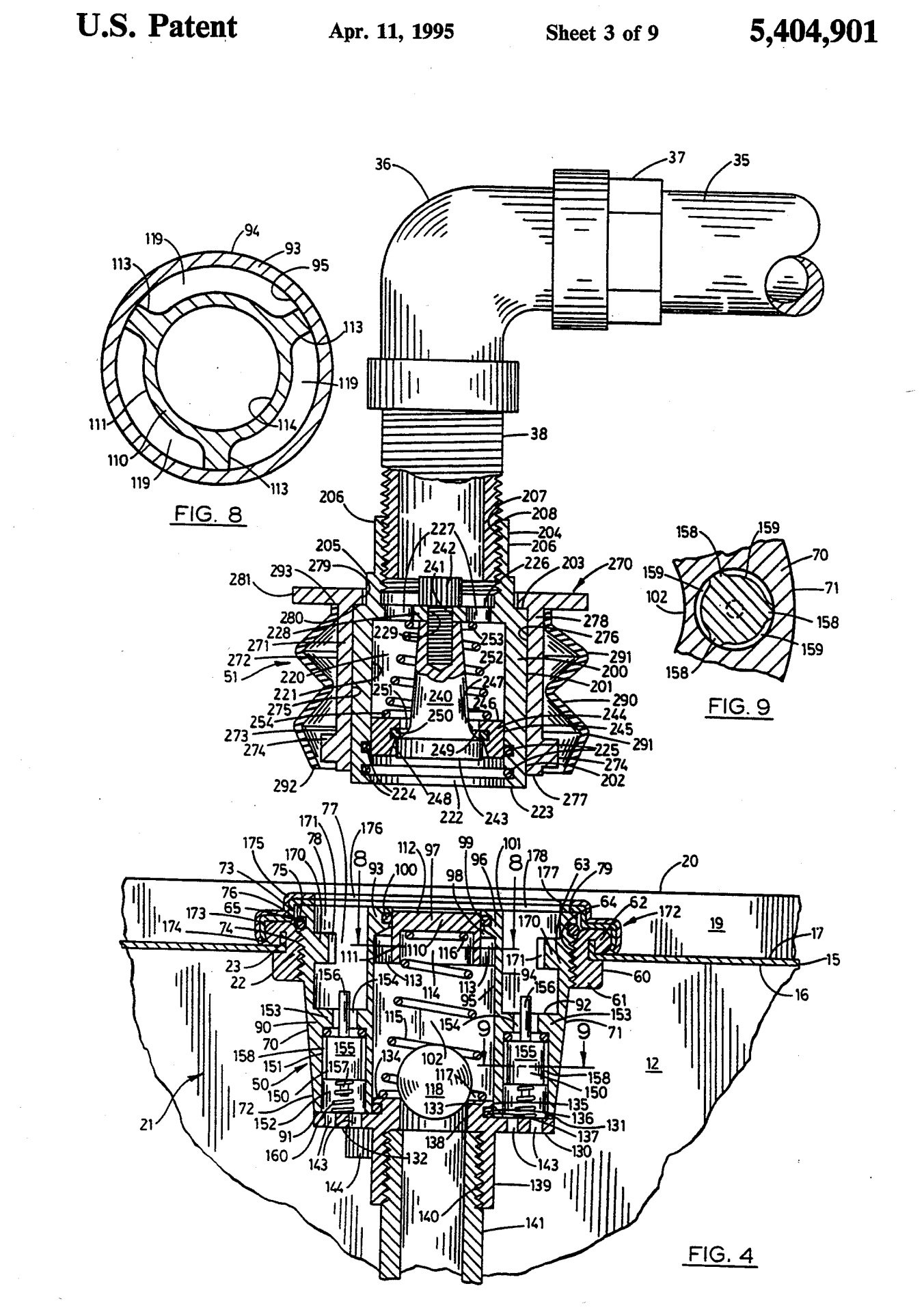

The housing 70 has a central projection or member 93 having a cylindrical outer surface 94 and a cylindrical internal surface 95. The member has an upper end wall 96 which, in turn, has a central bore or port 97. The port has a substantially cylindrical internal surface 98 containing an annular ring groove 99 housing an O-ring 100. The port is bounded by an annular end surface 101 which, as can best be seen in FIGS. 3 and 4, is substantially coplanar with the annular end surface 79 of the housing. The member 93 thus has a central passage 102 extending entirely therethrough.

A contact member 110, having an outer cylindrical surface 111, is slidably mounted Within the central port 97 of the central member 93 in fluid sealing engagement with the O-ring 100. The contact member has a contact surface 112 and three radially extending guides 113 extending outwardly from the outer cylindrical surface and into engagement with the internal surface 95 of the central member 93. The contact member has a lower chamber 114 facing inwardly of the central passage 102. A tapered coil spring 115 has an upper end portion 116 and an opposite lower end portion 117. The upper end portion is received in the lower end portion of the contact member. A valve ball 118 is received within the lower end portion of the coil spring and is not attached thereto so as to be capable of free floating movement within the bounds defined by the coil spring. The valve ball is captured on the lower side thereof by means hereinafter described. Referring more particularly to FIG. 8, the contact member, and more particularly the guides 113 thereof, define fluid passages 119 about the contact member within the central passage 102 of the central member.

An end plate, having an upper surface 131 and an opposite lower surface 132, is mounted on the lower surface 91 of the lower body portion 90. The end plate has a central projection 133 having a substantially flat upper surface 134 and a cylindrical outer surface 135. The outer surface has a ring groove 136 extending thereabout housing an O-ring 137. The end plate is mounted on the housing 70 with the central projection 133 received within the central passage 102 at the lower end portion 72 of the housing 70. With the O-ring 137 engaging the internal surface 95 in fluid sealing relation. The end plate has a central bore 138 extending therethrough in coaxial relation to the central passage 102 and having a collar 139 borne by and extending from the lower surface 132 thereof. The collar has internal screw threads 140 in which is mounted an extraction conduit 141 having a lower end portion 142 adjacent to the interior surface 16 of the bottom wall 14 of the drum 11. As shown best in FIG. 7, two sets of three air holes 143 extend through the mounting plate in the positions shown in FIGS. 3, 4 and 7. The mounting plate is secured on the lower surface 91 of the lower body portion by a pair of bolts 144 extending through holes in the mounting plate and into screw threaded holes in the lower body portion 90, not shown. Thus, the lower end portion 117 of the tapered coil spring 115 engages the upper surface 134 of the central projecting 133 and the valve ball 118 is captured in free floating relation within the tapered coil spring, as best shown in FIGS. 3 and 4.

Figure 7:
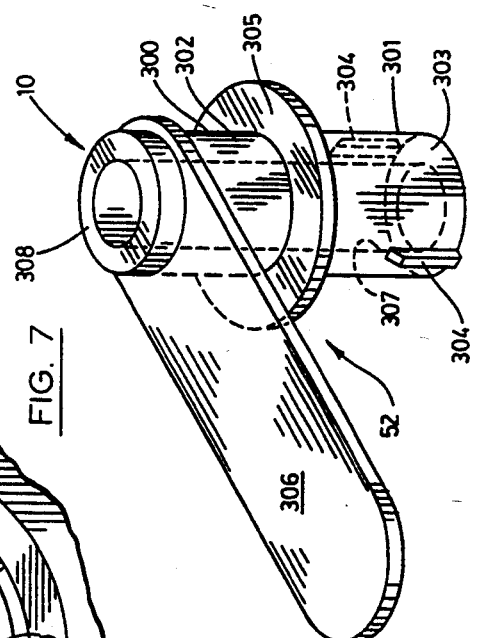
FIG. 7 is a somewhat enlarged, horizontal section taken along line 7—7 in FIG. 2.

A pair of air valve assemblies 150 are individually provided in the lower body portion 90 of the housing 70 in the positions best shown in FIGS. 3 and 4 and 7. Each air valve assembly includes a cylindrical bore 151 extending into the lower body portion through the lower surface 91 laterally disposed relative to the central passage 102 and individually in communication with one set of three air holes 143. The cylindrical bore is defined by a cylindrical surface 152 and terminates at an upper end wall 153. An upper bore 154 extends through the upper end wall to establish fluid communication between the cylindrical bore 51 and the upper chamber 77 of the housing 70.

A valve member 155 is slidably received within each cylindrical bore 151 of each air valve assembly 150. Each valve member has an upper contact pin 156, which extends through the upper bore 154, and a lower contact pin 157, which extends in the direction of the air holes 143. As can best be seen in FIG. 9, the valve member has three guides 158 disposed in slidable engagement with the cylindrical surface 152 of the cylindrical bore and defining air passages 159 therebetween about the valve member. A tapered coil spring 160 is received about the lower contact pin and is captured between the valve member and the end plate 130. A resilient valve seat 161 is mounted on the upper end wall 153 about the upper bore 154 and the upper contact pin 156 for fluid sealing engagement with the valve member when the valve member is disposed in the position shown in FIG. 4.

Figure 6:
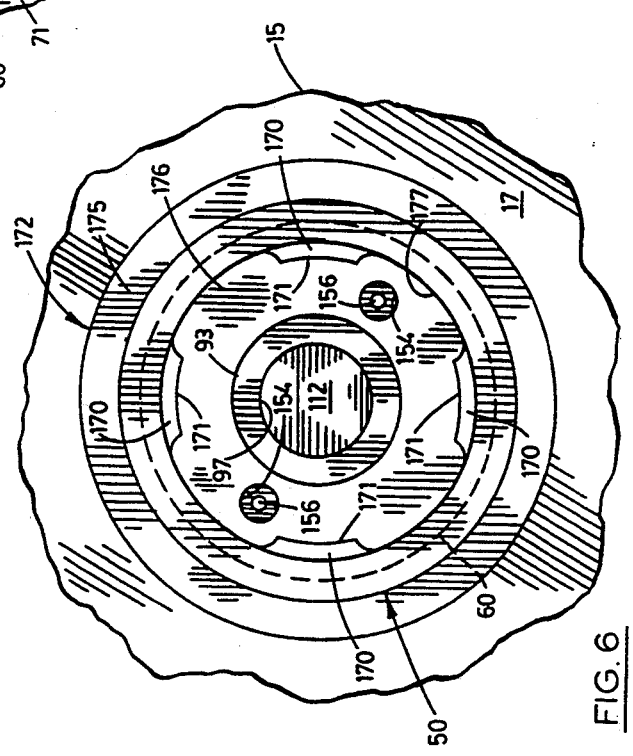
FIG. 6 is a somewhat enlarged, fragmentary, top plan view taken on 6—6 in FIG. 2.

Referring more particularly to FIGS. 4 and 6, four internal lugs 170, having arcuate surfaces 171, are mounted on the housing within the upper chamber 77 spaced in predetermined positions from the floor surface 92 of the upper chamber, as shown in FIG. 4, and from each other, as shown in FIG. 6.

The mounting collar 60 and upper end portion 73 of the housing 70 are sealed by a sealing assembly 172. The sealing assembly includes a plastic seal 173, having peripheral portions 174, which is received about and covers the collar and upper end portion 73 of the housing. The peripheral portions 174 of the plastic seal are crimped about the crimped portion 62 of the mounting collar to retain the plastic seal in position. A metal securing ring 175 is mounted on the plastic seal extending about the crimped portion 62 of the mounting collar in covering relation to the peripheral portions 174 of the plastic seal. The metal securing ring has a circular opening 176 which is defined by a peripheral edge 177 coinciding with the mouth 78 of the upper chamber 77 and thus just overlaying the annular end surface 79 which is immediately beneath the plastic seal 173. In operation the plastic seal is severed by an operator running a knife or other sharp instrument inwardly of the peripheral edge 177 bounding the circular opening 176 of the metal securing ring so as to sever the plastic seal forming a circular opening 178, as will hereinafter be described in greater detail.

The male assembly or coupling 51 of the apparatus for fluid transfer 10 of the present invention has a body 200 having a cylindrical outer surface 201. The body has a lower end portion 202 and an opposite annular shoulder 203. The body has an upper end portion 204 having a substantially cylindrical outer surface 205. The substantially cylindrical outer surface 205 is cylindrical except for a pair of substantially parallel wrench surfaces 206. The upper end portion 204 has an internally screw threaded opening 207 and an annular upper surface 208.

Figure 5:
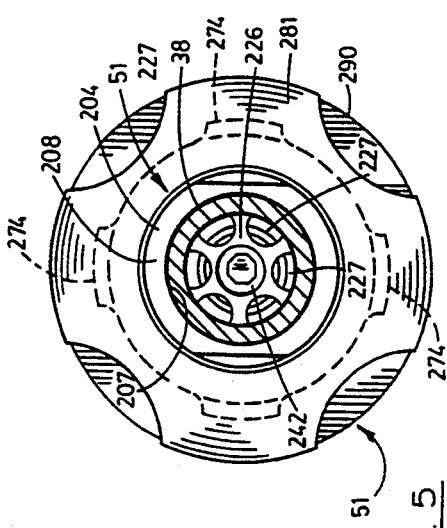
FIG. 5 is a somewhat enlarged, horizontal section taken along line 5—5 of FIG. 2.

A cylindrical bore 220 defined by a cylindrical surface 221 extends inwardly of the body 200 from a mouth 222. The mouth is bounded by an annular lower surface 223. The mouth is circumscribed by a pair of ring grooves 224 individually housing O-rings 225. A spider plate 226, best shown in FIG. 5, is mounted within the body extending transversely of the cylindrical bore 220 substantially in alignment with the annular shoulder 203. The spider plate has a plurality of fluid openings 227 extending therethrough and a central portion 228 having a bolt hole 229 extending therethrough concentric to the longitudinal axis of the cylindrical bore 220.

A plunger or actuator 240, having an internally screw threaded bore 241, is mounted on the spider plate 226 by a bolt 242 extending through the spider plate and screw-threadably secured in the screw threaded bore 241 to mount the actuator concentric to the longitudinal axis of the cylindrical bore 220. The actuator has a contact surface 243 facing the mouth 222. A sealing collar 244, having an outer cylindrical surface 245 is slidably received in the cylindrical bore 220 with the outer cylindrical surface 245 thereof in sliding engagement with the cylindrical surface 221 of the cylindrical bore 220. The sealing collar has an upper spring surface 246 and a central fluid passage 247 extending therethrough. The fluid passage is defined by an internal surface 248 having a circumscribing ring groove 249 housing an O-ring 250. The actuator has an outer sealing surface 251 disposed for fluid sealing engagement with the O-ring in the arrangement shown in FIG. 4. A tapered coil spring 252, having an upper end portion 253 and an opposite lower end portion 254 extends about the actuator with the upper end portion engaging the spider plate 226 and the lower end portion engaging the sealing collar 244 so as resiliently to retain the sealing collar in the position in fluid sealing relation with the O-ring 250, as shown in FIG. 4.

An attachment collar 270 is slidably received about the body 200 of the coupling 51. The attachment collar has a cylindrical body 271 having a cylindrical outer surface 272 and a lower end portion 273. As shown in FIGS. 3, 4 and 5, the four attachment lugs 274 are mounted on the cylindrical outer surface 272 of the attachment collar for engagement, as will hereinafter be described, with the internal lugs 170 of the housing 70. The cylindrical body has an internal passage 275 defined by a cylindrical internal surface 276. The cylindrical body has an annular end surface 277 extending about the lower end portion 202 of the body 200. The body has an upper end portion 278 having an upper opening 279 extending therethrough in communication with the internal passage 275, but of smaller diameter so as to form an internal annular lip 280 adapted gravitationally to rest on the annular shoulder 203 of the body 200, as shown in FIGS. 3 and 4. A grasping flange 281 is mounted on the upper end portion 278 extending outwardly therefrom and having a shape convenient for grasping and operation thereof.

A resilient, accordion type shroud 290 is received about the cylindrical body 271 of the attachment collar 270 and has pleats 291 adapted to permit the shroud to be collapsed from the uncollapsed condition shown in FIG. 4 to the collapsed condition shown in FIG. 3. The shroud has an annular lower edge 292 and an opposite annular upper edge 293.

Figure 10:
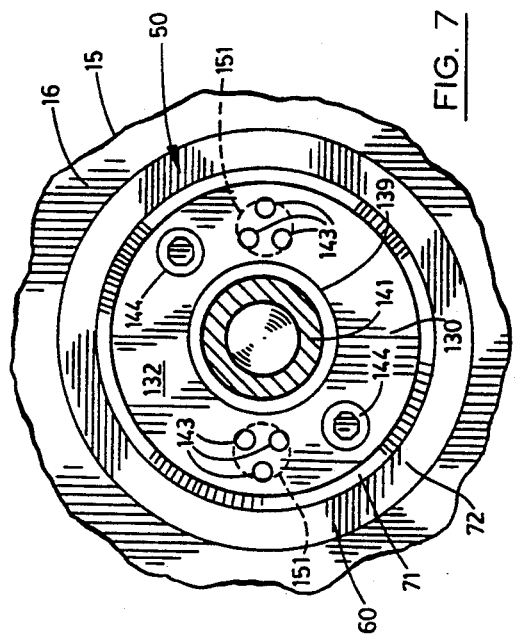
FIG. 10 is a perspective view of the housing removing tool of the apparatus of the fluid transfer of the present invention.

The apparatus for fluid transfer 10 includes the housing removing tool 52 shown in FIG. 10. The housing removing tool has a cylindrical body 300 having a lower portion 301 and an opposite upper portion 302. The lower portion 301 has a cylindrical outer surface 303 mounting a pair of engagement lugs 304 dimensioned for engagement with the internal lugs 170 within the upper chamber 77 of the housing 70, as will hereinafter be described. The lower and upper portions of the body are separated by a radially extending flange 305. A handle 306 is mounted on the upper portion 302. An internal passage 307 extends through the cylindrical body defined by a cylindrical surface 308.

The operation of the described embodiment of the present invention is believed to be clearly apparent and is briefly summarized at this point. The drum 11 is fitted with the valve assembly 50 in the manner heretofore described either at the time of manufacture of the drum, or can be retrofitted into existing drums or other containers in the manner described.

Where the internal chamber 21 of the drum is to be filled with a fluid for subsequent use by the user, the housing removal tool 52 shown in FIG. 10 is employed to remove the housing 70 from the mounting collar 60. At this time the sealing assembly 172 is not in place. The lower portion 301 of the cylindrical body 300 of the housing removing tool 52 is inserted into the upper chamber 77 of the housing 70 and disposed so that the engagement lugs 304 engage two of the internal lugs 170 within the upper chamber. The operator then, grasping the handle 306, applies rotational pressure to the internal lugs 170 of the housing in either a clockwise or counterclockwise direction, depending upon the type of screw threads employed, screw-threadably to remove the housing from the mounting collar 60. The housing 70 and extraction conduit 141 are then removed as a unit from within the drum 11 so as to open the screw threaded bore 63. The drum is then filled using conventional means with the fluid to the prescribed level.

The drum 11 is sealed by a reversal of the steps involved so as screw-threadably again to mount the housing 70 within the internally screw threaded bore 63 to position the O-ring 76 in sealing engagement with the shoulder surface 65. The sealing assembly 172 is then installed to provide a last security seal against leakage and for the purpose of identifying when the container has been subject to tampering by unauthorized persons. As can be seen upon reference to FIG. 4, the actual physical sealing of the container is accomplished by O-ring 76 engaging the shoulder surface 65 in fluid sealing engagement; O-ring 100 engaging outer cylindrical surface 111 of the contact member in fluid sealing relation; and valve members 155 engaging their respective resilient valve seats 161 in fluid sealing relation.

Significantly, the entire housing 70 and sealing assembly 172 are recessed beneath the upper edge 20 of the chime 19, as shown in FIG. 4. Thus, the upper edge of the chime constitutes a protective bearer for the housing so as to prevent damage thereto. Furthermore, there are no exposed portions of the valve assembly. Should the drum be dropped during handling, impact with the earth is absorbed by the chime and contact with the housing 70 is prevented. This is true even in the case of drums inadvertently dropped from moving vehicles onto a hardened roadway. The drum thus constitutes a secure singled unit which avoids the inadvertent release of toxic substances in the case of accident or negligent handling of the drum. Furthermore, as previously noted, tampering involving the drum can immediately be detected as a result of the sealing assembly.

When it is desired to extract the fluid contents from the drum 11, the coupling 51 is screw-threadably secured on the externally screw threaded end portion 38 of the elbow 36 as best shown in FIGS. 1 and 4. Using a sharp instrument, such as a knife, the operator severs the plastic seal 173 of the sealing assembly 172 about the peripheral edge 177 of the metal securing ring 175 and removes the central portion thereof forming the circular opening 178 and thereby exposing the upper chamber 77 of the housing and the central member 93 thereof. Grasping the elbow 36 and grasping flange 281, the operator presses the lower end portion 202 of the body 200 about the central member 93 so that the central member slides into the cylindrical bore 220 thereof. As such downward movement is continued, the contact surface 243 of the actuator 240 engages the contact surface 112 of the contact member 110 so as to force the contact member from the position shown in FIG. 4 to the position shown in FIG. 3. At the same time, the annular end surface 101 of the central member contacts the sealing collar 244 so as to move it from the position shown in FIG. 3. This draws the O-ring 250 away from the outer sealing surface 251 of the actuator. The attachment collar 270 is then rotated to position the attachment lugs 274 beneath the internal lugs 170 of the housing so as to lock the coupling 51 in fluid transferring relation to the valve assembly 50 in the position shown in FIG. 3.

Thus, upon reference to FIG. 3, it will be seen that a complete and open path is established for movement of the fluid from within the internal chamber 21 of the drum 11 through the extraction conduit 241, about the valve ball 118, through the fluid passages 119 about the contact member 110, through the central passage 102 of the central member 93, through the port 97, through the central fluid passage 247, through the tapered coil spring 252, through the fluid openings 227 of the spider plate 226 and to the fluid pump 30 through the intake conduit 33. The pump is, of course, operable to pump fluid received through the intake conduit 33 from the fluid pump through the discharge conduit 32 to the desired destination for use. As will be apparent, once pumping by the fluid pump 30 has begun, the valve ball 118 is lifted from rested engagement in the central bore 138 of the end plate 130. Thereafter, the valve ball is free to be retained by such fluid motion in the position shown in FIG. 3 so that a continuous path is maintained for the fluid from the internal chamber 21 of the drum 11 to the fluid pump 30.

Similarly, as can be seen upon reference to FIG. 3, the annular lower surface 223 of the coupling 51 depresses the upper contact pins 156 of the air valve assemblies 150 in the position heretofore described so as to move the valve members 155 thereof from sealing engagement with the resilient valve seats 161. Thus, a path of ambient air movement is established from externally of the container to the internal chamber 21 through the upper chamber 77 of the housing 70, the upper bores 154, the cylindrical bores 151, and the air holes 143. The shroud 290 operates to prevent any of the fluid within the drum from inadvertently escaping, particularly at the time of attachment of the collar 51 to the valve assembly 50. However, the shroud is sufficiently loose that ambient air can gain access to the upper chamber and through the air valve assemblies 150 to the internal chamber 21 so as to prevent a vacuum from forming within the internal chamber of the drum as the fluid is extracted therefrom.

When the desired quantity of fluid has been extracted from the internal chamber 21 of the drum 11, operation of the fluid pump 30 is discontinued. Coupling 51 is removed from the described engagement with the valve assembly 50 shown in FIG. 3 by a reversal of the steps heretofore described. Thus, the attachment collar 270 is rotated in either direction to release attachment lugs 274 from engagement with the internal lugs 170 of the housing 70 and the coupling is pulled free from the housing. The operable portions of the housing and coupling are instantly returned to their normal sealing positions shown in FIG. 4 avoiding leakage of fluid or fluid vapors from the valve assembly and the coupling. As can be visualized in FIG. 4, the tapered coil spring 252 returns the sealing collar 244 to the same sealing position shown in FIG. 4 immediately upon removal of the coupling 51 from the valve assembly 50. Thus, residual fluid within the coupling is entrapped within the coupling, elbow 36 and intake conduit 33. The drum and the coupling and related equipment are thus immediately sealed, upon such disconnection for subsequent use without risk of inadvertent leakage of fluid or fluid vapor from either.

Once the drum 11 has been emptied of its fluid contents, it can be returned to the manufacturer for refilling in the manner described. Thus, the apparatus for fluid transfer 10 of the present invention completely eliminates the ecological problems associated with conventional devices including that of disposing of the containers and particularly those which have contained toxic materials.

Figure 11:
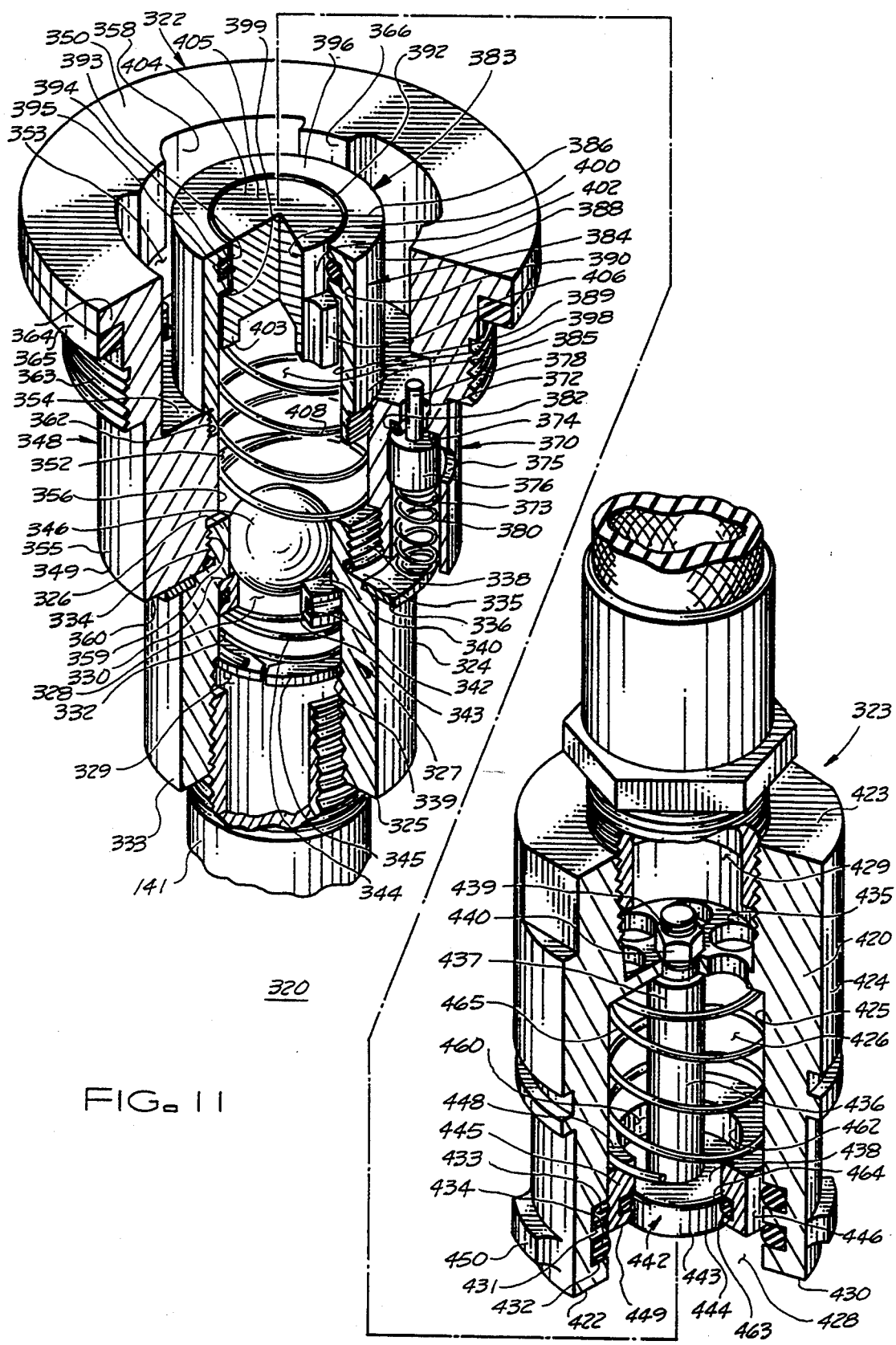
FIG. 11 is a sectional perspective view of the valve assembly and the coupler in an uncoupled relationship of a further embodiment of the present invention.

Referring now to FIGS. 11 and 24, an alternate embodiment of an apparatus for fluid transfer generally designated 320 is illustrated. Apparatus for fluid transfer 320 consist of a valve assembly 322 and a coupler 323. Apparatus for fluid transfer 320 including valve assembly 322 and coupler 323 is employed in substantially the same manner as apparatus for fluid transfer 10, with valve assembly 322 coupled to container 11 using mounting collar 60, and end portion 38 of elbow 36 coupled to coupler 323.

Valve assembly 322 includes a check valve 327 having a substantially cylindrical check valve body 324 with an inlet end 325 and an outlet end 326. A bore 328 extends axially through check valve body 324 from outlet end 326. A counter bore 329 extends through check valve body 324 from inlet end 325, concentric with bore 328. Counter bore 329 has a greater diameter than bore 328, forming an annular shoulder 330 therebetween. Check valve body 324 has a cylindrical inner surface 332 defining counter bore 329, and outer cylindrical surface 333. Check valve body 324 has an upper portion 334 proximate outlet end 326, and inset from outer surface 333. An outwardly directed annular shoulder 335 is formed between inset upper portion 334 and outer surface 333. An annular flange 336 extends outward from annular shoulder 335. Outer threads 338 are formed on inset upper portion 334, and inner threads 339 are formed in inner surface 332 proximate inlet end 325 for engaging extraction conduit 141.

An annular sliding ring 340 with a ring groove 342 housing an O-ring 343 inscribed about its circumference, is slidably mounted within counter bore 329. Annular ring 340 has an outer diameter great enough to form a seal between O-ring 343 and inner surface 332, and an inner diameter defining a bore 341 extending therethrough. In its upper most position, annular ring 340 abuts shoulder 330. A compression spring 344 extends between annular ring 340 and inlet end 325. Annular ring 340 and compression spring 344 are held within counter bore 329 by a washer 345 threaded into inner threads 339. A spherical valve member 346 having a diameter slightly greater than the inner diameter of annular ring 340, is located downstream of annular ring 340 proximate outlet end 326, and normally resides in fluid sealing engagement in bore 341. Annular ring 340 is slidably moveable between shoulder 330 and washer 345 and is biased against shoulder 330 by compression spring 344.

A valve assembly housing 348 having an inlet end 349 and outlet end 350, is generally cylindrical in shape and coupled to outlet end 326 of check valve body 324. A central bore 352 extends axially through valve assembly housing 348 from inlet end 349. A counter bore 353 extends through valve assembly housing 348 from outlet end 350 concentric with bore 352. Counter bore 353 has a greater diameter than bore 352, forming annular shoulder 354 therebetween. Valve assembly housing 348 has a cylindrical outer surface 355, a cylindrical inner surface 356 proximate inlet end 349 and defining bore 352, and a cylindrical inner surface 358 proximate outlet end 350 and defining counter bore 353. Inner threads 359 are formed on inner surface 356 proximate inlet end 349, and are configured to receive outlet end 326 of check valve body 324, with outer threads 338 engaging inner threads 359. Inlet end 349 of valve assembly housing 348 has an inlet end surface 360 which abuts annular shoulder 335 when valve assembly housing 348 is coupled to check valve body 324. Additional inner threads 362 are formed on inner surface 356 proximate shoulders 354. Outer threads 363 are formed on outer surface 355 proximate outlet end 350. An outwardly extending annular lip 364 extends from outlet end 350, with an annular seal 365 encircling outer surface 355 and abutting annular lip 365.

Retaining members, which in this embodiment are internal lugs 366, extend radially inward from inner surface 358 proximate outlet end 350. In this embodiment, four internal lugs 366 are used, but it will be understood that more or less may be used.

Outer threads 363 are configured to be received by collar 60 coupled to drum 11 in opening 22. Collar 60 is disclosed previously, and illustrated in FIGS. 3 and 4. Annular seal 365 is compressed between shoulders surface 65 of collar 60 and lip 364, forming a fluid tight seal.

A pair of vent valves 370 are individually provided at inlet end 349 of valve assembly housing 348. Vent valves 370 are laterally disposed relative to central bore 352 and counter bore 353. Vent valves 370 each consist of a bore 372 extending through valve assembly housing 348 from shoulders 354. A counter bore 373 extends into valve assembly housing 348 from inlet end surface 360, concentric with bore 372. Counter bore 373 has a greater diameter than bore 372, forming shoulders 374 therebetween. A vent opening 375 extends through outer surface 355 of valve housing assembly 348 and joins with counter bore 373 proximate shoulders 374. A valve member 376 is slidably received within counter bore 373 of each vent valve 370. Each valve member 376 has an upper contact pin 378, which extends upward through bore 372 and past shoulders 354 into counter bore 353. A lower contact pin 379 extends from valve member 376 in the direction of inlet end surface 360. A compression spring 380 is received about lower contact pin 379 and is captured between valve member 376 and annular flange 336 of check valve body 324 when valve assembly housing 348 is coupled thereto, urging valve member 376 into a closed position. An O-ring 382 is fitted in counter bore 373 against shoulders 374. When in the closed position, valve member 376 is pressed by compression spring 380 against O-ring 382 preventing any fluid communication between bore 372 and vent opening 375. The operation of vent valve 370 and additional embodiments will be discussed in greater detail below.

Still referring to FIGS. 11 and 24, a release valve 383 is coupled to valve assembly housing 348 and extends from central bore 352. Release valve 383 consist of a release valve body 384 which is generally cylindrical in shape having an inlet end 385 and an outlet end 386. Release valve body 384 has a cylindrical outer surface 388 and cylindrical inner surface 389. Release valve body 384 has an upper endwall 390 which, in turn, has a central bore 392. Bore 392 has a substantially cylindrical internal surface 393 containing an annular ring groove 394 housing an O-ring 395. Central bore 392 is bounded at outlet end 386 by an annular abutment surface 396. Release valve body 384 has a counter bore 398 extending into release valve body 384 from inlet end 385, defined by cylindrical inner surface 389. Counter bore 398 has a greater diameter than central bore 392 forming a shoulder 399 therebetween, proximate outlet end 386.

A valve member 400 having an outer cylindrical surface 402, is slidably mounted between an open and closed position within bore 392 of release valve body 384, in fluid sealing engagement with O-ring 395 in the closed position. Valve member 400 has an inlet end 403 and an outlet end 404. A substantially planner contact surface 405 is formed at outlet end 404, and three radial guides 406 extend radially outward from outer cylindrical surface 402 proximate inlet end 403, for engagement with inner surface 389 of release valve body 384. A compression spring 408 is positioned within counter bore 398 in engagement with inlet end 403 of valve member 400. When release valve body 384 is coupled to valve assembly housing 348, compression spring 408 is captured within counter bore 398 of release valve body 384 and bore 352 of valve assembly housing 348 between inlet end 403 of valve member 400 and outlet end 326 of check valve body 324. Valve member 400 is retained in the closed position, with radial guides 406 contacting shoulder 399, by the expansion of compression spring 408. To open release valve 383, valve member 400 is pressed downward against compression spring 408. Compression spring 408 is compressed between radial guides 406 of valve member 400 and outlet end 326 of check valve body 324. The operation of release valve 383 will be discussed in greater detail below.

Still referring to FIG. 11, coupler 323 is illustrated, consisting of a slide valve body 420 generally cylindrical in shape, having an inlet end 422, an outlet end 423, a generally cylindrical outer surface 424 and a generally cylindrical inner surface 425. A cylindrical bore 426 extends through slide valve body 420 and has an inlet port 428 at inlet end 422 and a threaded outlet port 429 at outlet end 423. Inlet port 428 is bounded by an annular inlet end surface 430. Inner surface 425 is circumscribe by a pair of parallel ring grooves 431 and 432 individually housing O-rings 433 and 434 respectively proximate inlet end 422 with ring groove 431 and O-ring 433 downstream, or towards outlet end 422 with respect to ring groove 432. A spider plate 435 extends from inner surface 425 perpendicular to the axis of bore 426, proximate threaded outlet port 429. A pedestal 436 having a first end 437 and a second end 438 extends from spider plate 435 towards inlet port 428. First end 437 of pedestal 436 has outer threads 439. First end 437 extends through spider plate 435 and is coupled thereto by a nut 440 threaded onto outer thread 439. Second end 438 terminates in a disc shape contact member 442 having a cylindrical outer surface 443 and a contact surface 444. Contact surface 444 is generally positioned between ring grooves 431 and 432. The purpose for this position will be discussed below.

A sliding valve member 445, having an outer cylindrical surface 446 is slidably received in cylindrical bore 426, with cylindrical outer surface 446 in sliding engagement with inner surface 425 of cylindrical bore 426. Sliding valve member 445 has a spring surface 448, and an opposing abutment surface 449 substantially coplanar with contact surface 444 of contact member 442. A central fluid passage 460 extends through sliding valve member 445 and has a diameter sufficient to receive outer surface 443 of contact member 442. Fluid passage 460 is defined by an internal surface 462 having a circumscribing ring groove 463 housing an O-ring 464. A compression spring 465 is captured between spider plate 435 and spring surface 438 of sliding valve member 445, biasing valve member 445 into engagement with contact member 442 in the closed position. In this position, O-ring 464 comes into fluid sealing engagement with outer surface 443 of contact member 442. Furthermore, O-ring 433 come into fluid sealing engagement with outer surface 446 of sliding valve member 445. This effectively seals inlet port 428 of sliding valve body 420.

Attachment lugs 450 extend radially outwards in a spaced apart relationship around the circumference of slide valve body 420 proximate inlet end 422, corresponding to internal lugs 366 of valve assembly 322. Attachment lugs 450 extend from slide valve body 420 a distance sufficient to engage underneath internal lugs 366 when coupler 323 is received by valve assembly 322.

Referring now to FIG. 26, coupler 323 is illustrated in engagement with valve assembly 322. Slide valve body 420 is received in counter bore 353 of valve assembly housing 348, with inner surface 425 enclosing release valve body 384. O-ring 434 of slide valve body 420 comes into immediate fluid sealing engagement with outer surface 388 of release valve body 384. When coupler 323 is received by valve assembly 322, contact surface 444 of contact member 442 abuts contact surface 405 of valve member 400, and abutment surface 396 of release valve body 384 abuts abutment surface 449 of sliding valve member 445. In response to a longitudinal compressive force applied to coupler 323, contact member 442 depresses valve member 400 against compression spring 408, allowing fluid engagement between central bore 392 and counter bore 398. At substantially the same time, abutment surface 396 forces sliding valve member 445 against coil spring 465, towards spider plate 435. O-ring 464, no longer in fluid sealing engagement with outer surface 443 of contact member 442, allows fluid communication between bore 426 of sliding valve body 420 and central bore 392 of release valve body 384.

Coupler 323 is retained in engagement with valve assembly 322 against the expansive forces of compression spring 408 and compression spring 465 by the engagement of interior lugs 366 with attachment lugs 450. When coupler 323 is pressed into valve assembly 322 a partial rotation of coupler 323 with respect to valve assembly 322 engages attachment lugs 450 underneath interior lugs 366. The expansion forces of compression springs 408 and 465 press coupler 323 away from valve assembly 322 forcing attachment lugs 450 upwards against interior lugs 366. While sufficiently strong to provide adequate engagement between coupler 323 and valve assembly 322, for removing material from container 11, interior lugs 366 and attachment lugs 450 also provide a safety break-away feature. In response to a minimal amount of torque, coupler 323 will rotate in either direction. Rotation of coupler 323 results in attachment lugs 450 disengaging from underneath internal lugs 366. Without the engagement between interior lugs 366 and attachment lugs 450 retaining coupler 323 in engagement with valve assembly 322, compression springs 408 and 465 forceably repel coupler 323 from assembly 322. At the same time, operable portions of valve assembly 322, and coupler 323 are instantly returned to their normal sealing positions, avoiding leakage of fluid.

When suction is applied to outlet end 423 of slide valve body 420, fluid is drawn from drum 11, forcing spherical valve member 346 out of fluid sealing engagement with annular ring 340. The continuous flow of fluid through valve assembly 322 keeps check valve 327 in the open position allowing free flow of fluid through valve assembly 320 and coupler 323. When suction is removed, spherical valve member 346 returns into fluid sealing engagement with annular ring 340, preventing fluid from flowing back into drum 11.

Referring now to FIG. 27, a biased check valve 327 is illustrated, including a compression spring 468 captured within bore 352 and counter bore 398, between spherical valve member 346 and valve member 400. Spring 468 biases spherical valve member 346 into fluid sealing engagement with annular ring 340. When coupler 323 is in engagement with valve assembly 322, suction applied to coupler 323 will be sufficient to overcome the bias from spring 468, opening check valve 327. However, the biasing of check valve 327 with spring 468 prevents back flow of fluid into drum 11 when valve assembly 322 is positioned at different attitudes, such as on its side.

Referring now to FIG. 24 and FIG. 25, the operation of sliding check valve 327 is illustrated. FIG. 24 illustrates valve assembly 322 in a closed configuration without coupler 23 engaged. In normal operation, bore 352 and counter bore 398 between spherical valve member 346 and valve member 400 contain a given volume of gaseous fluid such as air. This volume may be reduced by the sliding movement of valve member 400, compressing the gas and allowing coupler 323 to be received by valve assembly 322. However, instances may occur when liquid from drum 11 is trapped in this volume. While a gaseous fluid may be compressed, the compressibility of a liquid fluid is very slight, resulting in a hydraulic brake which prevents the sliding movement of valve member 400. This renders valve assembly 322 inoperable. Liquid can collect in bore 352 and counter bore 398 in different ways, such as a back flow of liquid when suction is removed from coupler 323, or the result of drum 11 being stored on its side, allowing liquid to flow through an unbiased check valve 327 into bore 352 and counter bore 398. This situation can be partially corrected by biasing spherical valve member 346 against annular ring 340 as illustrated in FIG. 27 and discussed above. However, liquid may still be trapped by back flow of material. To prevent this condition from disabling valve assembly 322, sliding check valve 327 is used.

Referring now to FIG. 25, it can be seen that the depression of valve member 400 results in the sliding movement of annular ring 340 along inner surface 332 of bore 328. In this manner, the volume of liquid is not reduced, but shifted downward, allowing the fluid seal between outer surface 402 of valve member 400 and O-ring 395 to be removed. One skilled in the art will understand that while a sliding check valve is taught in the preferred embodiment, resulting in the movement of the volume of liquid, a closed porous material could be inserted between valve member 400 and spherical valve member 346. This would allow for the compression of the volume occupied by the closed porous material which, inturn, would allow for movement of valve member 400. In this situation, liquid would not enter the closed porous material and not affect its compressibility.

Referring now to FIG. 12 and 13, the operation of vent valves 370 is illustrated. FIG. 12 illustrates vent valve 370 in the closed position, with contact pin 378 extending upward through bore 372 into counter bore 353. Valve member 376 is in fluid sealing engagement with O-ring 382, preventing any fluid communication between bore 372 and vent opening 375.

Upon engagement of coupler 323 with valve assembly 322, inlet end surface 430 contacts contact pin 378 depressing valve member 376 against coil spring 380 as illustrated in FIG. 13. In this open position, valve member 376 is no longer in fluid sealing engagement with O-ring 382, allowing fluid communication between bore 372 and vent opening 375. In this position, ambient outside atmosphere can be drawn in through bore 352 of valve assembly housing 348, bore 372 and vent opening 375, preventing a vacuum from being formed in drum 11.

Referring now to FIG. 14-16, an alternate embodiment of a vent valve 470 is illustrated. Vent valve 470 is similar to vent valve 370, however, a secondary compression spring 472 is included, enclosing a contact pin 473 extending from a generally cylindrical valve member 475. Valve member 475 is slidably mounted in counter bore 373 between an open and closed position, with contact pin 473 extending into bore 372. In this embodiment, contact pin 473 does not extend into central bore 352 past shoulder 354 of valve assembling housing 348, but is received in compression spring 472 which inturn extends through bore 372 past shoulder 354 into central bore 352. FIG. 14 illustrates vent valve 470 biased in a closed position by compression spring 380, with valve member 475 in fluid sealing engagement with O-ring 382.

FIG. 15 illustrates vent valve 470 in a closed configuration, with inlet end surface 430 of slide valve 420 compressing compression spring 472. In this configuration, valve member 475 remains in fluid sealing engagement with O-ring 382, since the bias of compressed compression spring 472 is insufficient to overcome the bias of compression spring 380.

During removal of material, a vacuum is created in drum 11. The pressure differential thus created between the interior of the drum and the ambient external pressure, results in the compression of compression spring 380 as illustrated in FIG. 16. The differential pressure and the releasing tension of compression spring 472 combine to overcome the bias of compression spring 380. When the pressures have equalized, compression spring 380 moves valve member 475 back into fluid sealing engagement with O-ring 382, substantially prohibiting back flow of fluid through vent valve 470.

Referring now to FIG. 17 and 18, a further embodiment of a vent valve, generally designated 480 is illustrated. Differential vent valve 480 operates substantially identical to differential vent valve 470, without a secondary compression spring, and a spherical valve member 482 replacing the cylindrical valve member. In the closed position, compression spring 380 biases spherical valve member 482 into fluid sealing engagement with O-ring 382. FIG. 18 illustrates vent valve 480 in an open configuration with vent opening 375 and bore 372 in fluid connection.

Referring now to FIG. 28, a tool 466 is illustrated having a handle 467 and an engagement member 469. Tool 466 is used to insert the sliding check valve seat into check valve body 324. In operation, washer 345 is received by engagement member 469, annular ring 340 and compression spring 344 are inserted into bore 328 of check valve body 324. Tool 466 is then used to threadably insert washer 345 in engagement with inner threads 339, forcing compression spring 344 and annular ring 340 into position against shoulder 330. Engagement member 469 is then removed from washer 345.

Referring now to FIG. 19, a coupler 484 which is substantially identical to coupler 323, and having a slide valve body 485 with an inlet end 486 an outlet end 488 and an outer surface 489 is illustrated. Coupler 484 differs slightly from coupler 323, with slide valve body 485 having thinner walls than slide valve body 420, and two opposing attachment lugs 490 extending radially outward from slide valve body 485 proximate inlet end 486. A selective venting collar 492 having an inlet end 493, an inlet end surface 497 and an outlet end 494, an outer surface 495 and an inner surface 496 encircles coupler 484. A bore 498 extends through selective venting collar 492, and a pair of opposing slots 499 extend through collar 492 into bore 498 proximate inlet end 493. A thickened portion 500, which in this embodiment has a knurled surface for enhancing friction for gripping, encircles collar 492 proximate outlet end 494.

To facilitate attaching collar 492 to coupler 484, collar 492 is bisected along a central vertical axis to form two halves 503 and 504. Each collar half 503 and 504 having an inset bolt hole 505 and threaded bolt hole 506 extending through the thickened portion thereof. Inset bolt hole 505 of each half 503 and 504 corresponds to the threaded bolt hole 506 of the opposite half 503 and 504 to form a pair of bolt holes extending through thickened portion 500 of collar 492 along a tangential to either side of central bore 498. A bolt 508 is inserted in inset bolt hole 505 and threaded into threaded bolt hole 506, joining collar half 503 to collar half 504 encircling coupler 484.

Referring now to FIG. 20, encircling collar 492 is vertically and rotationally slidable upon outer surface 489 of coupler 484. Attachment lugs 490 of coupler 484 extend through slots 499, to engage internal lugs 366 on valve assembly 322.

Referring now to FIG. 21, the two positions of selective venting collar 492 are illustrated. A closed vent position is illustrated by the solid lines, with lug 490 held in a lower portion 508 of slot 499 by a tab 509. FIG. 22 illustrates coupler 484 engaged with valve assembly 322, with selective venting collar 492 in the closed position. It can be seen that slide valve body 485 of coupler 484 does not depress contact pin 378 of vent valves 370. Therefore, vent valve 370 remains closed.

The broken line in FIG. 21 illustrates selective venting collar 492 in the open vent position. Collar 492 is rotated and depressed, with lug 490 extending through an upper portion 510 of slot 499. Collar 492 is held in position against lug 490 by a tab 512. In this position, as illustrated in FIG. 23, collar 492 drops lower with inlet end surface 497 contacting contact pin 378 depressing valve member 376. This removes valve member 376 from fluid sealing engagement with O-ring 382 allowing fluid communication between vent opening 375 and bore 372. With this selective venting feature, coupler 484 can be engaged with valve assembly 322 and extraction of fluids started before venting drum 11. This would allow a slight vacuum to be formed in drum 11 before venting, to insure no fluids from escaping drum 11 through the vents due to a buildup of pressure.

FIG. 29 illustrates another embodiment of a tamper evident seal 520. Tamper evident seal 520 includes a securing ring 522, preferably made of deformable metal, crimped around mounting collar 60 and outlet surface 366 of valve assembly housing 348. Securing ring 522 has a circular opening 523 corresponding to central bore 352 of valve assembly housing 348. A circular pull tab is affixed to securing ring 522, covering circular opening 523. In this embodiment, circular pull tab 524 is affixed with a non reusable adhesive, but one skilled in the art will understand that it may be integral with circular ring 522 with perforations defining circular opening 523, or a plastic seal 173 as discussed above. Which ever securing seal assembly is used, when a user obtains a container with circular pull tab 524 in place the user is insured that the valve has not been tampered with. Circular pull tab 524 is removed as illustrated in FIG. 31, and coupler 323 is engaged removed, it cannot be replaced, assuring the users awareness that tampering has occurred.

The second function of securing seal assembly 520 is illustrated in FIG. 30. Securing ring 522 prohibits the removal of valve assembly 322. In order to remove valve assembly 322 as illustrated in FIG. 30, securing ring 522 must be removed or deformed. This informs the supplier, upon return of the container, that valve assembly 322 has been tampered with and the container is possibly contaminated. If securing ring 522 is not deformed or has not been removed, the supplier is made aware that valve assembly 322 has not been removed, and since no fluid can be inserted through valve assembly 322 into the container, is aware that the container has not been contaminated and may be reused without rinsing.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A dry-break valve for transferring fluid from a container and for preventing return of said fluid to said container, comprising:

a valve assembly constructed to allow only removal of fluid from said container, said valve assembly including:

a valve assembly housing having an inlet end for positioning within said container and an outlet end, a release valve movable between an open position and a closed position, coupled to said outlet end, a check valve coupled to said inlet end so as to prevent fluid flow into said container, and an anti-fluid lock assembly for allowing said release valve to open when a liquid is present between said release valve and said check valve; and a coupler removably receivable by said valve assembly.

2. A dry-break valve as claimed in claim 1 wherein said release valve includes a release valve body having an inlet end, an outlet end, a bore extending therethrough, and a valve member positioned within said bore for movement between said open position and said closed position, said anti-fluid lock assembly further comprising a displacing means for allowing movement of said valve member in a direction towards said inlet end of said valve body.

3. A dry-break valve as claimed in claim 2 wherein said valve assembly body includes a bore extending therethrough, a volume of said bore defined between said release valve and said check valve, and said displacing means includes a closed porous material located in said volume.

4. A dry-break valve as claimed in claim 2 wherein said valve assembly body includes a bore extending therethrough, a volume of said bore defined between said release valve and said check valve, said displacing means includes a sliding check valve seat biased towards said outlet end of said valve assembly body, and slidable in a direction towards said inlet end.

5. A dry-break valve for transferring fluid from a container and for preventing return of said fluid to said container, comprising:

a valve assembly constructed to allow only removal of fluid from said container, said valve assembly including;

a valve assembly housing having an inlet end for positioning within said container and an outlet end, a release valve movable between an open position and a closed position, coupled to said outlet end, and a check valve coupled to said inlet end so as to prevent fluid flow into said container;

a coupler removably receivable by said valve assembly; and a tamper evident seal for sealing said valve assembly to said container, comprising:

a securing ring sealing said valve assembly to said container and having a central opening; and a removeable center tab affixed to said securing ring, covering said central opening.

6. A dry-break valve for transferring fluid from a container and for preventing return of said fluid to said container, comprising:

a valve assembly constructed to allow only removal of fluid from said container, said valve assembly including;

a valve assembly housing having an inlet end for positioning within said container and an outlet end, a release valve movable between an open position and a closed position, coupled to said outlet end, and a check valve coupled to said inlet end so as to prevent fluid flow into said container, a coupler removably receivable by said valve assembly;

a break-away assembly for coupling said coupler to said valve assembly and for forcibly repelling said coupler from said valve assembly upon the application of torque to said coupler;

an anti-fluid lock assembly for allowing said release valve to open when a liquid is present between said release valve and said check valve; and a vent assembly for allowing entry of an ambient external atmosphere into an interior of said container.

7. A dry-break valve as claimed in claim 6 wherein said valve assembly includes an outlet end and said coupler includes an inlet end, and said break-away assembly further comprises retaining members for removably holding said inlet end of said coupler in engagement with said outlet end of said valve assembly.

8. A dry-break valve as claimed in claim 7 wherein said anti-fluid lock assembly further comprising a displacing means for allowing movement of said valve member in a direction towards said inlet end of said valve body.

9. A dry-break valve as claimed in claim 8 wherein said vent assembly further includes:

a vent bore extending eccentrically through said valve assembly housing with respect to said bore of said valve assembly housing, providing fluid communication between said ambient external atmosphere and said container interior;

a valve member housed in said vent bore for interrupting fluid communication between said ambient external atmosphere and said container interior; and actuator means for moving said vent valve member from a closed to an open position.

10. A dry-break valve as claimed in claim 9 wherein said actuator means is a contact pin extending from said vent valve member, contacted by said coupler received by said valve member.

11. A dry-break valve as claimed in claim 9 wherein said actuator means is a pressure differential built up between said container interior and said exterior ambient atmosphere.

12. A dry-break valve as claimed in claim 9 wherein said valve assembly further includes a counterbore extending into said valve assembly housing from said outlet end, concentric with said bore and having a greater diameter than said bore, and a shoulder disposed between said bore and said counterbore, said vent bore extending from said shoulder to said inlet end of said valve assembly housing eccentric to said bore extending through said vent assembly housing.

13. A dry-break valve as claimed in claim 12 further comprising:

an annular valve seat mounted in said vent bore proximate said shoulder;

said vent valve member slidably mounted in said vent bore and biased in fluid sealing engagement with said valve seat, preventing fluid communication between said vent bore and said counterbore in said closed position; and said actuator means is a contact pin extending from said vent valve member into said counterbore of said valve assembly housing.

14. A dry-break valve as claimed in claim 13 wherein a collar is slidably affixed to said coupler having a raised and a lowered position, for selective engagement with said contact pin in the lowered position.

15. A method of fluid transport comprising the steps of:

providing a container having an interior and an opening;

filling said container with a fluid;

providing a valve assembly;

closing said opening with said valve assembly;

providing a tamper evident seal having a securing ring, a central opening formed in said securing ring, and a covering tab affixed to said securing ring, covering said central opening;

sealing said valve assembly with said tamper evident seal, wherein said securing ring seals said valve assembly to said container;

transporting said filled container to a user;

inspecting said tamper evident seal, and removing said covering tab from said securing ring when it has not been tampered with; and removing said fluid from said container through said central opening.

16. A method as claimed in claim 15 wherein the step of inspecting said tamper evident seal includes viewing said tamper evident seal and determining if said seal has been tampered with.

17. A method as claimed in claim 16 wherein said step of determining if there is tampering includes determining if said covering tab has been removed.

18. A method as claimed in claim 17 further comprising the steps of:

returning empty container to a supplier;

inspecting said securing ring and removing said securing ring when it has not been tampered with;

removing said valve assembly; and refilling said container and repeat previous steps.

19. A method as claimed in claim 18 wherein the step of inspecting said securing ring includes viewing said securing ring and determining if said securing ring has been removed or deformed.

20. A method as claimed in claim 15 wherein the step of removing said fluid includes:

providing a coupler receivable by said valve assembly;

engaging said valve assembly with said coupler through said central opening of said securing ring;

removing said fluid through said valve assembly and said coupler; and disconnecting said coupler.

21. A valve assembly for regulating a flow of fluid, permitting fluid flow in only a single direction, said valve assembly comprising:

a valve assembly housing having an inlet end and an outlet end, said single direction being from said inlet end to said outlet end;

a check valve coupled to said inlet end so as to prevent fluid flow in other than the single direction;

a release valve, coupled to said outlet end, said release valve including a release valve body having an inlet end, an outlet end, a bore extending therethrough, and a valve member positioned within said bore for movement between an open position, movement towards said check valve, and a closed position; and an anti-fluid lock assembly including displacement means, for allowing movement of said valve member towards said check valve.

22. A valve assembly as claimed in claim 21 wherein said valve assembly body includes a bore extending therethrough, a volume of said bore defined between said release valve and said check valve, and said displacing means includes a closed porous material located in said volume.

23. A valve assembly as claimed in claim 21 wherein said valve assembly body includes a bore extending therethrough, a volume of said bore defined between said release valve and said check valve, said displacing means includes a sliding check valve seat biased towards said outlet end of said valve assembly body, and slidable in a direction towards said inlet end of said valve assembly body.

* * * * *